Aug. 6, 1940.  E. A. AVERILL  2,210,159
TANK GAUGE FOR MOVING VEHICLES
Filed Nov. 4, 1937   2 Sheets-Sheet 1
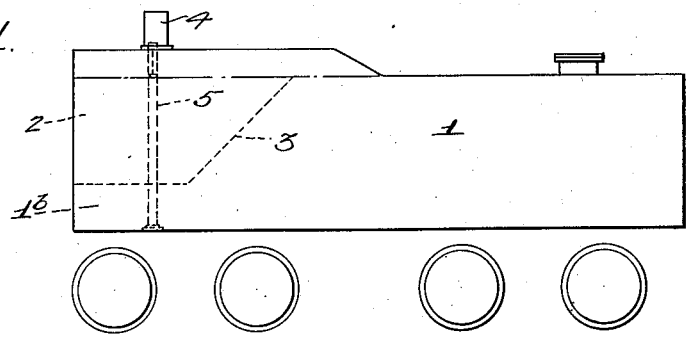
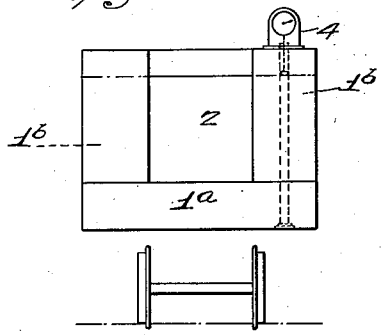
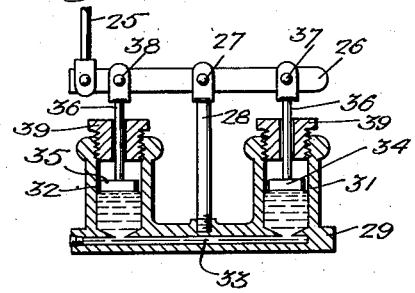
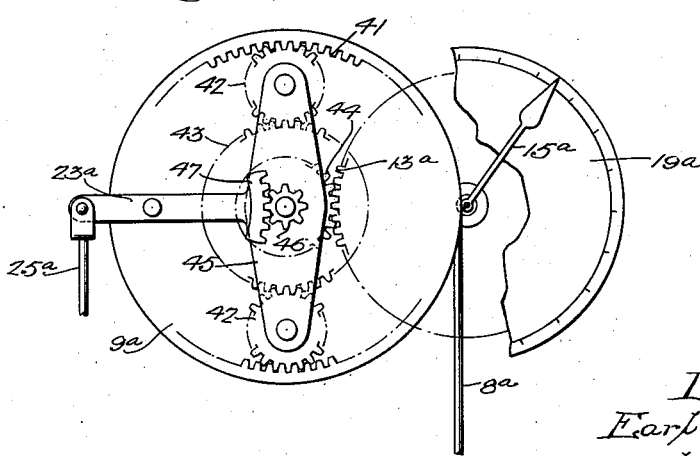
Inventor
Earl A. Averill
by his Attorneys
Howson & Howson Aug. 6, 1940.  E. A. AVERILL  2,210,159
TANK GAUGE FOR MOVING VEHICLES
Filed Nov. 4, 1937  2 Sheets-Sheet 2
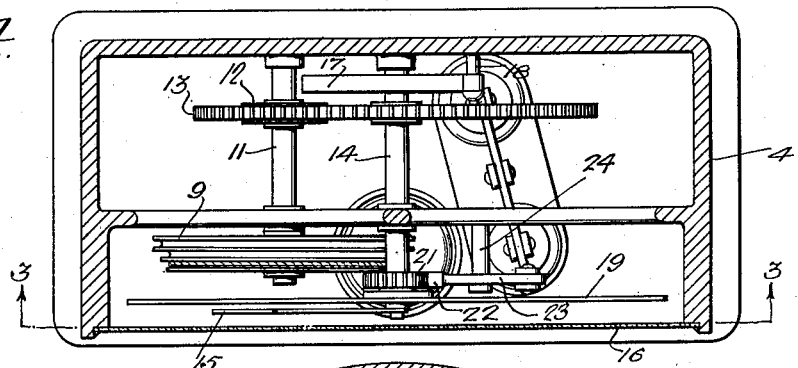
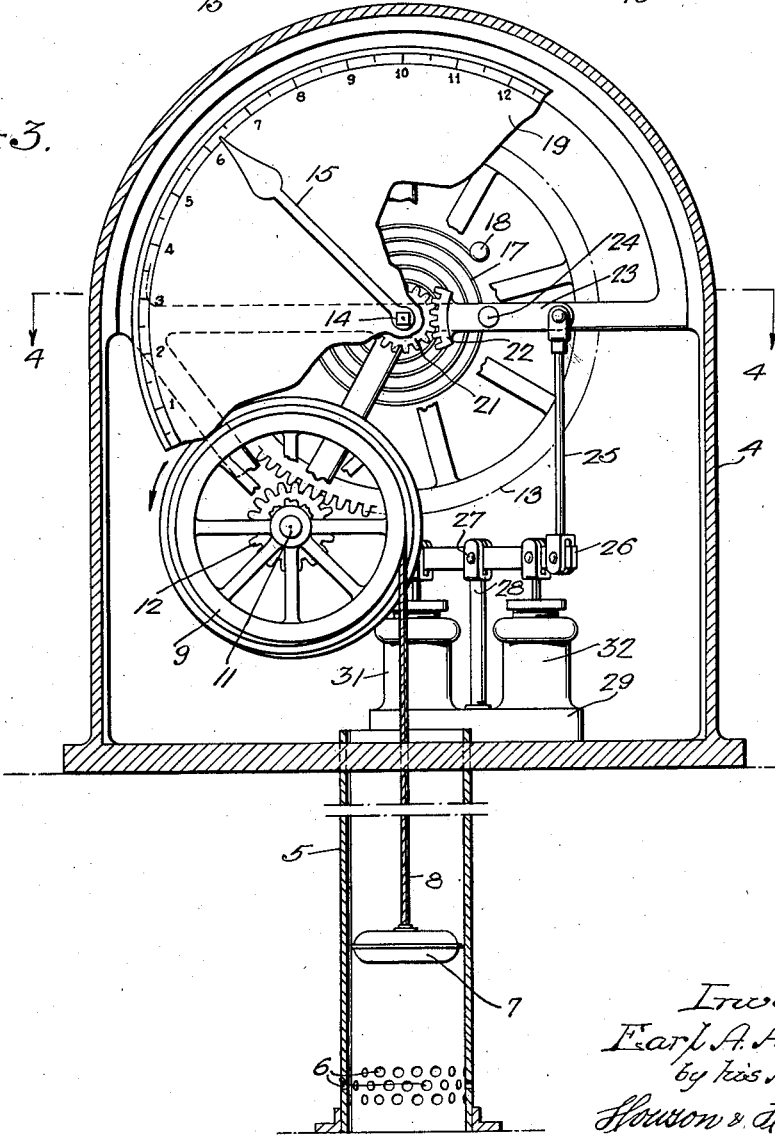
Inventor
Earl A. Averill
by his Attorneys
Howson & Howson Patented Aug. 6, 1940

2,210,159

UNITED STATES PATENT OFFICE 2,210,159

TANK GAUGE FOR MOVING VEHICLES

Earl A. Averill, Adams, N. Y.

Application November 4, 1937, Serial No. 172,803

7 Claims. (Cl. 73—306)

This invention relates to improvements in devices for indicating the volume of water or other liquid in the tanks of moving vehicles, and a principal object of the invention is to provide a practical and rugged device of this character that may be mounted in a position adjacent the front end of a locomotive tender in proximity to the cab of the locomotive and which shall be capable under all conditions of affording a continuous accurate indication of the volume of water present in the tender tank.

Conventional water level indicators are inadequate as a means for affording a continuous accurate measure of the volume of water in locomotive tenders. The water tanks of tenders are invariably of odd shapes and vary in transverse dimensions from top to bottom, so that the changes in water level and volume are not necessarily proportionate to the other. Furthermore, the water level at any one point in the tank is subject to continual variation, being dependent upon a number of variable factors, such, for example, as the weight of coal contained in the coal hopper of the tender and the angular position of the tender with respect to the horizontal both in the longitudinal and transverse directions. Thus if the tender is moving up a grade, the water level at the front of the tank will be abnormally low, whereas the level of the water at the rear of the tank will be abnormally high; and similarly the depths of water at the opposite or transverse sides of the tank will vary if one of the underlying rails is lower than the other, a condition occurring, for example, on curves. These variables may be offset to some extent, but not completely rectified, by placing the water level indicator on the tender approximately over the intersection of the longitudinal and transverse center lines of the latter, but such location of the indicator is not practical, by reason of its relative remoteness to the locomotive cab and the resultant difficulty of inspection by the enginemen.

It is a principal object of the invention, stated in more specific terms, to provide a device which is independent of all the variable factors set forth above, which may be located on the tender in proximity to the locomotive cab, and which may be depended upon under all conditions to give a continuous and accurate indication of the actual volume of water present in the tank.

The invention further resides in the novel structural and mechanical details hereinafter described and illustrated in the attached drawings, in which:

Figure 1 is a diagrammatic side elevational view of a locomotive tender equipped with a device made in accordance with my invention;

Fig. 2 is a front end elevational view of the tender;

Fig. 3 is a sectional elevational view of the indicating device taken on the line 3—3, Fig. 4;

Fig. 4 is a sectional plan view on the line 4—4, Fig. 3;

Fig. 5 is a fragmentary sectional view illustrating one of the elements of the mechanism illustrated in Figs. 3 and 4, and Fig. 6 is a diagrammatic view illustrating a modification within the scope of my invention.

With reference to Figs. 1 and 2, a typical locomotive tender consists of a tank body 1 having at its forward end, i. e., that end which normally adjoins the locomotive, an open compartment 2 for reception of coal. Conventionally the coal compartment 2 is provided at its rear end with an inclined wall 3 which tends to gravitate the coal downwardly and toward the forward end of the compartment where it is most available to the fireman, and conventionally also the water tank 1 is extended forwardly at the bottom and at each side of the compartment 2, as indicated in Fig. 2, by the reference numerals 1a and 1b. It is apparent that with this lack of symmetry in the horizontal cross section of the tank at different heights, a change in the level of the water in the tank is not necessarily accompanied by a proportionate change in the volume of water present, and that the ratio of change will vary in the different vertical sections of the tank. It will be equally apparent that any departure of the tank body from a true horizontal position either longitudinally or transversely will inject an abnormality in the water level or depth of water in the different sections of the tank, so that here again the level of the water is not a dependable measure of the water volume. This is particularly true where the indicator is located in a desirable position at the forward end of the tender in proximity to the locomotive cab. The device hereinafter described has been designed to fully compensate all of the foregoing variables and to afford an accurate indication based on the water level in the forward end of the tender tank, or in any other desired section, of the actual volume of water in the tank.

Referring to Figs. 3 and 4, the device in a preferred embodiment comprises a casing 4 which may, as illustrated in Figs. 1 and 2, be mounted at the top of the tender above one of the water legs 1b of the tender tank and at the forward end of the latter. At the bottom of the casing 4, a tube 5 extends downwardly through the water leg 1b and through the extension 1a to the bottom of the tank, and the lower end of the tube 5, as shown in Fig. 3, is provided with a plurality of small apertures 6 through which the water in the tank may have access to the interior of the tube. In the interior of the tube 5 is a float 7, to the top of which is connected a flexible cable 8, and this cable extends upwardly through the top of the tube 5 into the interior of the casing 4 and passes around a stepped pulley or sheave 9. The sheave 9 is secured to one end of a shaft 11 suitably journaled in the casing 4, and this shaft also carries a toothed pinion 12 which meshes with a large gear 13, this latter gear being attached to a shaft 14 also suitably journaled in the casing and extending parallel to the shaft 11. The shaft 14 carries at its forward end a pointer 15 which is visible through the transparent front 16 of the casing 4, and it will be apparent that with the arrangement described above, any movement of the float 7 longitudinally of the tube 5 will be transmitted through the cable 8, the sheave 9, the shaft 11 and pinion 12, and the gear 13 and shaft 14 to the pointer 15, and that the position of the said pointer will, therefore, vary with the changes of water level in the tube 5. A coiled spring 17 is secured between the rear end of the shaft 14 and a pin 18 in the casing 4, and this spring exerts a continuous torque upon the shaft 14 in a direction tending through the interconnecting elements to rotate the sheave 9 in the direction indicated by the arrow in Fig. 3. The torque exerted by the spring 17 is not, however, sufficiently strong to lift the float 7, but is sufficient when the float is elevated by an increase in the depth of water in the tube 5 to take up the slack developing in the cable 8. By this means, the movements of the float 7 and of the pointer 15 are exactly synchronized under all conditions of operation. It is to be noted further that the pulley 9 in its stepped arrangement is designed to compensate for the variable cross sectional area of the tank at the different levels, so that regardless of this variable, the position of the pointer 15 will constitute a true index of the volume of water present at any moment in the tank. With this arrangement, therefore, the position of the pointer 15 is not a true indication of water level, but does accurately indicate the water volume when the tank is in a horizontal position.

Journaled for rotation upon the forward end of the shaft 14 immediately behind the pointer 15 is a dial 19, and attached to the rear of the dial is a pinion 21 which is intermeshed with a segmental gear 22 at one end of a lever arm 23 pivotally mounted at 24 in the casing. The opposite end of the lever 23 is connected through a depending rod 25 with one end of a lever 26, this latter lever being pivotally supported at 27 upon an upright 28, the lower end of which is secured in a sub-casing 29 within the casing 4. The casing 29, as shown in Fig. 5, comprises, one at each side of the upright 28, a pair of vertically arranged cylinders 31 and 32 which are connected together at their lower ends by a transverse channel 33 extending through the base of the casing. Each of the cylinders 31 and 32 houses a float, 34 and 35 respectively, and from each of these floats a stem 36 extends upwardly and is pivotally connected at 37 and 38 to the lever 26 at opposite sides of and at equal distances from the pivot point 27. In the present instance each of the cylinders 31 and 32 is provided at the top with a threaded apertured plug 39 through which the rods 36 extend.

With reference to Figs. 3 and 4, it will be noted that the casing 29 is mounted so that the cylinders 31 and 32 occupy positions on a line extending diagonally to the front of the casing 4, and when, therefore, the casing 4 is mounted on the tender in the position shown in Fig. 2, the line between the cylinders 31 and 32 will also extend diagonally to the longitudinal center line of the tender, the degree of angularity depending upon the location of the device with respect to the longitudinal and transverse center lines of the tender. When, as shown in Fig. 5, the cylinders 31 and 32 are partially filled with a suitable liquid supporting the floats 34 and 35, it will be apparent that any departure in the position of the tender from the true horizontal, either longitudinally or transversely of the tender, will be accompanied by a change in the relative heights of the liquid in the cylinders 31 and 32, and by a resultant adjustment of the lever 26 about the pivot 27. Such pivotal movement of the lever 26 will be translated through the rod 25 to the lever 23, and thence through the segmental gear 22 to the pinion 21 and to the dial 19. The arrangement of the parts is such that any movement of the dial 19 will correspond substantially to the movement of the pointer 15 that results from the change of water level in the tube 5 arising from the same departure of the tender 1 from the normal horizontal position that causes the dial movement. Assume, for example, that with the tender in the true horizontal position, the pointer 15 lies as shown in Fig. 3 between the six and six and one-half graduations on the dial, and that as a result of the tilting of the tender, either transversely or longitudinally, or both, the pointer is removed from this position to one indicating a greater volume of water in the tank than is actually present. This same tilting of the tender which causes the departure of the needle 15 from its true position with respect to the dial also causes a movement of the dial through the cylinders 31 and 32 and the associated mechanism as described above, and this movement of the dial will be in the same direction as the movement of the pointer and will have an extent bringing the dial into its original relative position with respect to the pointer. Although as a result of the tilting of the tender there is an adjustment of both the pointer and the dial, the one is compensatory to the other and maintains the pointer and the dial in their original relative positions.

It will be noted, therefore, that the aforedescribed device compensates all the variables which tend to prevent a continuous accurate indication of the volume of water in the tank. The sheave 9 as previously described is so formed as to compensate the variations resulting from the irregular form of the tank, and any departure from the normal horizontal position in either or both of the longitudinal and transverse directions of the tender is compensated through the cylinders 31 and 32 and the associated elements. Thus at all times and under all conditions a true indication of the volume of the water in the tank is afforded. While other liquids may be suitable for use in the cylinders 31 and 32, I prefer to employ a liquid of high specific gravity, such as mercury, so that movement of the floats 34 and 35 and of the associated transmission elements which connect the floats with the dial may be highly positive.

In Fig. 6, I have illustrated a modification within the scope of my invention. In this case, the dial 19a is stationary. The cable 8a extending from the float 7 passes over a sheave 9a which comprises in this instance an internal gear 41. This gear 41 is operatively connected through pinions 42, 42 with a spur gear 43. The spur gear 43 has relatively fixed thereto a smaller spur gear 44 which meshes with a gear 13a associated with the pointer 15a. The pinions 42, 42 are carried at opposite ends of an arm 45 which is pivotally mounted on an axis concentric with the axis of the gears 41, 43 and 44, and this arm has fixed thereto a pinion 46 which meshes with a segmental gear 47 on the end of the lever 23a. When the sheave 9a is moved by a change in the level of the liquid due to inclination of the tank, the compensator will act through the rod 25a and lever 23a to move the pinion frame 45 to a proportional degree, thereby taking up the movement of the internal gear 41 without transmitting movement to the gear 43. The position of the pointer 15a thus remains unchanged. In this device, the pointer 15a is moved only when a change occurs in the level of the liquid in the tank due to increase or decrease in the volume of water present.

I claim:

1. In a device for indicating the quantity of a liquid in the tank of a moving vehicle, the combination with indicating means, of a float for actuating the indicating means in response to changes in the level of the liquid in the tank, a supplemental liquid receptacle, and a second float for actuating the indicating means in response to movements of the liquid in said supplemental receptacle arising from inclinations of the vehicle from a normal horizontal plane, said latter actuation rectifying the effects upon said indicating means of changes in the liquid level in said tank resulting solely from the inclinations of the vehicle from the normal plane.

2. In a device for indicating the quantity of a liquid in the tank of a moving vehicle, the combination with indicating means responsive to changes in the level of the liquid in the tank, of a separate float chamber unconnected with the tank and containing a substantially constant and entirely independent volume of liquid, float means in said chamber responsive only to changes in the contained liquid mass resulting from a tilting of the vehicle from the normal horizontal position, and means for operatively connecting said float means to the indicating means so as to rectify the effects upon said indicating means of changes in the liquid level in said tank resulting from the said inclination of the vehicle from the normal plane.

3. In a device for indicating the quantity of a liquid in the tank of a moving vehicle, the combination with indicating means comprising relatively movable dial and pointer elements, of means responsive to changes in the level of the liquid in the tank for actuating one of said elements, and means responsive to tilting of the vehicle from a normal horizontal position for actuating the other of said elements to rectify the error in the movement of the first-named element due to tilting of the vehicle.

4. In a device for indicating the quantity of a liquid in the tank of a moving vehicle, the combination with two separate float means, one of said float means being responsive to changes in the level of the liquid in said tank, and the other being responsive solely to changes in liquid level resulting from a tilting of the vehicle from a normal horizontal position, and indicator mechanism operatively associated with both of said float means whereby the second-named float means may rectify the errors in said indicator mechanism arising from changes in the water level within the tank due solely to the tilting of the vehicle from the normal horizontal position.

5. In a device for indicating the quantity of a liquid in the tank of a moving vehicle, the combination with indicating means and a float for actuating said indicating means in response to changing water levels in the tank, a second float device operatively associated with said indicating means and comprising a pair of float chambers arranged on a line angularly disposed with respect both to the longitudinal and transverse axes of the vehicle and having communication with each other, said chambers having therein a substantially constant volume of liquid, a float in each of said chambers, a pivoted lever to which said floats are connected at points respectively at opposite sides of said pivot and equidistant therefrom, and means for connecting the lever to said indicating means whereby the movements of the lever resulting from inclinations of the vehicle from a normal horizontal position may rectify the errors arising from said inclination in the actuation of the indicating means by the first-named float and thereby afford a true indication of the volume of the liquid in the tank.

6. In a device for indicating the volume of a liquid in the tank of a moving vehicle, the combination with means operative when the vehicle is in normal horizontal position for indicating the volume of the liquid in the tank, of means operatively connected with said indicating means for rectifying the error in the volumetric indication occurring when the vehicle departs from said horizontal, said rectifying means comprising a pair of interconnected float chambers arranged on a line angularly disposed both with the longitudinal and transverse axes of said vehicle, a float in each of said chambers, and a pivoted lever operatively connected with said floats and responsive through said floats to the tilting of said vehicle from the horizontal position.

7. In a device for indicating the quantity of a liquid in the tank of a moving vehicle, the combination with means operative when the vehicle is in normal horizontal position for indicating the level of the liquid in the tank, said means being subject to error when the vehicle departs from said horizontal, of means operatively connected with said indicating means for rectifying said error, said last-mentioned means comprising a separate float chamber unconnected with the tank and containing a substantially constant and entirely independent volume of liquid, and float means in said chamber responsive only to variations in the liquid mass resulting from the tilting of the vehicle from the horizontal.

EARL A. AVERILL.